Sept. 12, 1939.　　G. M. KRIEGBAUM ET AL　　2,172,980
TRACTOR ATTACHED IMPLEMENT
Filed Jan. 2, 1936　　5 Sheets—Sheet 5

Inventors
G. M. Kriegbaum
and C. C. Haas

Patented Sept. 12, 1939

2,172,980

UNITED STATES PATENT OFFICE 2,172,980

TRACTOR ATTACHED IMPLEMENT

George M. Kriegbaum and Clarence C. Haas, Richmond, Ind., assignors to International Harvester Company, a corporation of New Jersey Application January 2, 1936, Serial No. 57,226

10 Claims. (Cl. 111—59)

This invention relates to planters and more particularly to a direct connected tractor corn planter in which the corn planter and its mechanism is wholly supported from the tractor.

The main object of the invention is to mount a direct connected corn planter on a tractor so that the entire weight of the planter frame structure and mechanism, when transported, will be carried by the tractor.

Another object is to connect the covering wheels to the planter, which also serve as the gage wheels, so that they will support part of the weight of the planter as the operator begins to raise the planter into transport position.

Another object of the invention is to provide the planter attachment with quick detachable features so that it may be readily attached and detached from the tractor.

Still another object of the invention is to provide driving power for the planter mechanism from the rear axle of the tractor.

Another object of the invention is to throw out the doffer mechanism upon the raising of the planter to transport position.

Still another object of the invention is to throw out of gear the planter mechanism upon raising the planter to transport position.

A further object of the invention is to provide adjustment for various row spacings of the planting units.

Still another object of the invention is to provide means for using the planter over terraces.

Other objects and advantages will appear in the following description of a preferred embodiment of the invention, as illustrated in the accompanying drawings, where:

Figure 6 is a side elevation showing a portion of the lifting mechanism along line 6—6 of Figure 2 and looking in the direction of the arrows;

Figure 7 is a side elevation of the adjusting mechanism for the gage wheels along line 7—7 of Figure 2 and looking in the direction of the arrows;

In the construction illustrated, the tractor of a well-known tricycle type has an oblong casing 20 forming the rear end of the tractor body and containing the transmission and differential mechanism. The rear portion of this casing has bolted, or otherwise secured to it, on each side, the aligned tubular axle housings 21 containing the bearings for the axle shafts 22 which extend beyond the ends of the housings. Traction wheels 23 are adjustably secured to the axle ends. The casing 20 supports the centrally located driver's seat 24 in convenient relation to the usual steering wheel 25 and other controls, not shown. The casing 20 has suitable bearings in its lower portion for the central power take-off shaft 26 which projects from the rear wall thereof and is driven through suitable gearing within the casing, and by means of the power take-off, closely coupled implements requiring power may be driven therefrom. Cast integrally on the axle housings 21 are the inner and outer flanges 27 and 28. Secured to the inner flanges 27 are the coupling members 29 to which the quick detachable planter is attached. The coupling members 29 are disclosed in a copending application of Carl W. Mott, Serial No. 29,938, filed July 5, 1935.

In the present invention, the supporting structure for the direct connected tractor planter consists of two downwardly extending right and left hand members 30 and 31, respectively, connected to the coupling members 29 by the usual quick detachable coupling means as disclosed in the previously mentioned copending application of Carl W. Mott.

The supporting members 30 and 31 have formed integral therewith, forwardly projecting portions 32 which are slotted to permit the passage of the securing bolts 33 of the coupling members 29. The forwardly extending members 32 also act as a guide and support for the planter attachment when it is being attached to the tractor. Similarly, the supporting members 30 and 31 are attached to the coupling members 29 by other securing members 34 pivoted thereon which pass through slots in the outwardly extending legs of the supporting members 30 and 31. Secured to the bottom of the downwardly extending supporting members 30 and 31 respectively and inclined or extending rearwardly and upwardly are the right and left hand supporting members 35 and 36 which are secured in spaced apart relation at their upper ends by the spacing member 37. To secure the supporting members 35 and 36 in their correct alignment with the tractor, the downwardly and rearwardly extending right and left hand braces 38 and 39 extend from the supporting members 30 and 31 to the attaching member for the spacing member 37. These supporting members provide an overhanging means or boom structure. Pivoted at the lower ends of the supporting members 30 and 31 respectively are the rearwardly extending right and left hand frame members which are pivoted to permit the vertical adjustment of the planter attachment secured thereto and which will now be described. Secured at the rear of the longitudinally extending members 40 and 41 are the front and rear transversely extending frame members 42 and 43 respectively. The front and rear frame members 42 and 43, respectively, are securely braced by the forwardly extending braces 44 and 45 connected at their front ends respectively to the longitudinally extending frame members 40 and 41 and at their rear ends to the downwardly extending bracket members 46 and 46', and 47 and 47' secured to the front frame member 42 and the rear frame member 43, respectively. Secured at the outer right and left hand ends of the transversely extending frame of the planter are the right and left hand check wire guide and doffer mechanisms 48 and 49 respectively which are best shown and disclosed in the patent to R. L. Ford, 1,376,522, granted May 3, 1921. The longitudinally extending frame members 40 and 41 are secured to the front transversely extending frame member 42 by downwardly extending supports similar to the right and left hand supports 50 and 51 which secure the rear ends of the frame members 40 and 41 to the rear frame member 43. The frame members 42 and 43 are further braced by the longitudinally extending right and left hand brace members 52 and 53 which act as a support for the bearings 54 which rotatably support the transversely extending rockshaft 55 which carries the usual check wire forks 56 to engage the usual check wire buttons when the planter is used as a check row planter. The ends of the transverse rockshaft are suitably supported in the bracket members of the check wire guide and doffing mechanism. Pivotally mounted at each end of the transverse frame of the planter are the right and left hand marker bars 57 and 58 pivoted to the supporting brackets 47 and 47'.

The marker bars 57 and 58 are braced by the pivoted braces 59 and 60 which are pivoted at their upper ends to the marker bars 57 and 58 and at their lower ends to brackets 61 and 62 secured to the front frame member 42. These marking bars 57 and 58 may be raised and lowered in the usual manner, in that as one marker bar is raised, the other is lowered and vice versa by having a rope connecting the two together.

Figure 4:
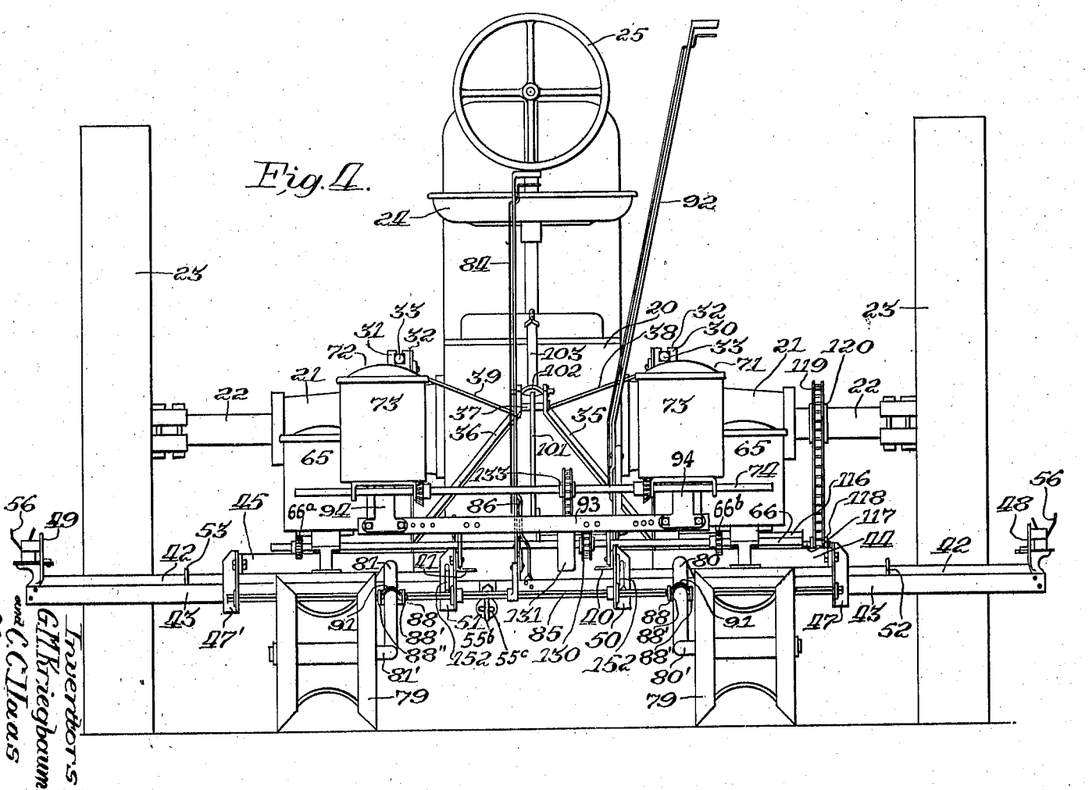
Figure 4 is a rear view of the planter mechanism as shown in Figure 1.
Figures 5, 8:
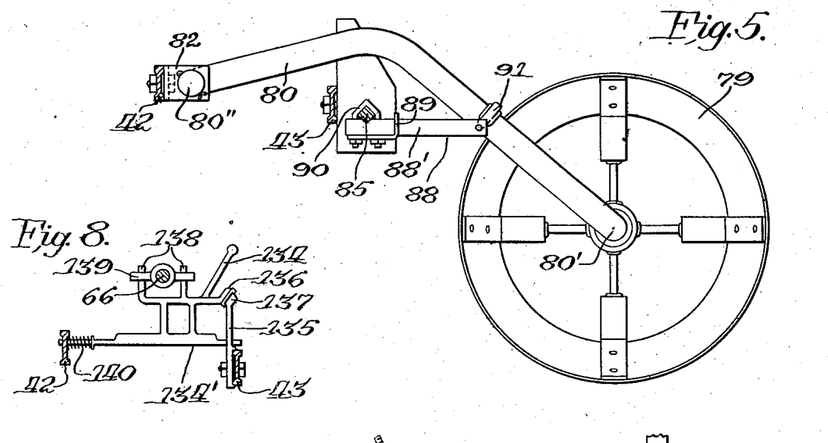
Figure 5 shows the side elevation of the planter gage and covering wheel taken along the line 5—5 of Figure 2 and looking in the direction of the arrows.
Figure 8 is a side elevation of the adjusting mechanism for the number of seeds sown by the planter mechanism along line 8—8 of Figure 2 and looking in the direction of the arrows; and, Figure 9 is a side elevation of a mechanism for changing the planter from hill drop to drilling as shown along the line 9—9 of Figure 2 in the direction of the arrows.
Figures 6, 7, 9:
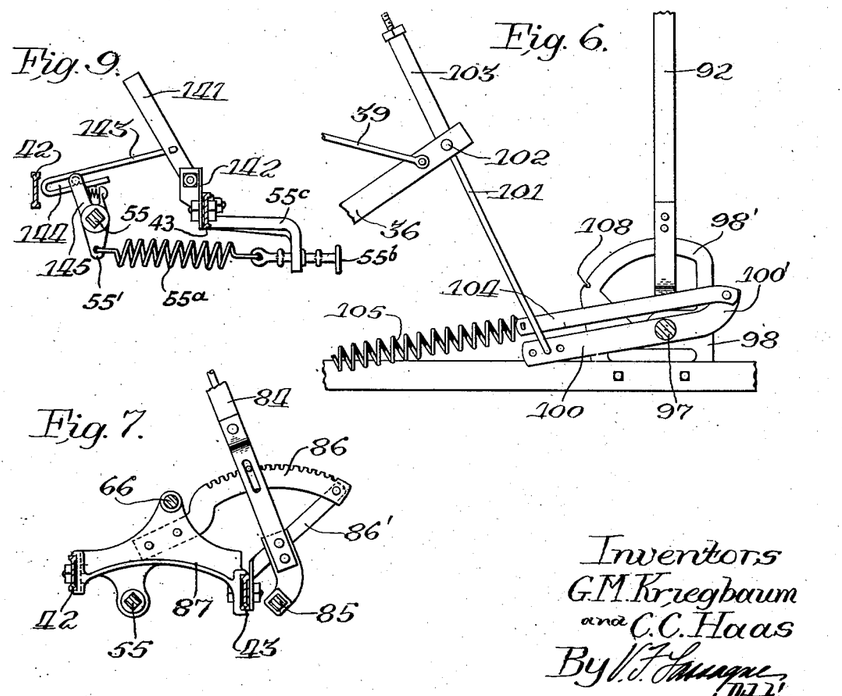

The usual seed dropping mechanism including the hopper with its revolving seed planter and the furrow opener are adjustably mounted on the transverse frame members 42 and 43 so that the seed may be sown in rows, the spacing of the rows being from 28 to 44 inches. It is to be understood that the spacing of these units may be extended further, but the spacing from 28 to 44 inches is the distance usually encountered in drilling while in check row planting the usual spacing is from 32 to 44 inches. The right and left hand planting units 63 and 64 are symmetrically mounted about the longitudinal axis of the planter which is a continuation of the longitudinal axis of the tractor. Units 63 and 64 consist of the seed hoppers 65 having their seed plates driven through suitable gearing from the transversely extending drive shaft 66. Each hopper and its mechanism is supported on a seed boot 67 which in turn has extending portions 68 and 68' for securing the boot and its mechanism to the front and rear transverse frame members 42 and 43, respectively. Through the supporting bracket 68 of the seed boot the planter units 63 and 64 may be adjusted laterally on the transverse members 42 and 43. The runner or furrow opener 69 is attached to the bottom of the seed boot 67 at its rear portion and at its forward portion the runner 69 is supported by braces 70 and 70' attached to the bracket portion of the seed boot 67. The seed dropping mechanism within the seed boots 67 may be similar to the mechanism disclosed in the patent to Dennis 1,725,446, granted August 20, 1929. Suitable fertilizing units 71 and 72 are symmetrically placed as the planting units 63 and 64 and these also may be adjusted laterally for the various row spacings from 28 to 44 inches. The fertilizer units 71 and 72 consist of the usual fertilizer hoppers 73 with their feeding mechanism driven from the transversely extending drive shaft 74. A flexible tube 75 connects the fertilizer hoppers 73 with a fertilizer depositing unit 76 attached to the rear of the seed boot 67. The fertilizer units and their depositing unit 76 may be similar to the mechanism disclosed in the patents to Kriegbaum et al. 1,921,885 and 1,921,886 granted August 8, 1933. The crank arm 77 of the fertilizer depositing unit is connected by a link 78 to another crank arm secured to the check row shaft 55 of the planter. In this manner as the planter mechanism is operated through the check row shaft 55 the mechanism of the fertilizer depositing unit 76 operates at the same time. The transverse shafts 66 and 74 have splines 66' and 74', respectively, to permit lateral adjustment of the planting units 63 and 64 and the fertilizing units 71 and 72. The depth of the planter is gaged by gage wheels or means 79 which are symmetrically placed about the longitudinal axis of the planter and trail behind the furrow openers 69 of each planter unit and act as covering wheels for the furrow left by the furrow opener and fertilizer depositing units 69 and 76, respectively. The gage wheels or means 79 are pivotally mounted for adjustment in a vertical plane by the longitudinally extending right and left hand wheel supporting arms or means 80 and 81. The gage wheels 79 are rotatably mounted on a transversely extending portion 80' and 81' of the wheel arms 80 and 81. The wheel arms 80 and 81 are pivotally supported on the front frame member 42 by the supporting brackets 82 and 83 through which the inner extending transverse portions 80'' and 81'' are journaled. The supporting brackets with their wheel arms 80 and 81 may likewise be adjusted laterally according to the row spacing of the planter units 63 and 64 and the fertilizer units 71 and 72. As best shown in Figures 5 and 7, the gage wheels 79 are adjusted simultaneously by means of the adjusting lever 84 secured to the transverse rockshaft 85. The lever 84 is secured in adjusted position by the usual detent in the notches of the adjusting quadrant 86. The adjusting quadrant 86, as shown in Figure 7, is secured to a longitudinally extending supporting bracket 87 which is secured to the front and rear transverse members 42 and 43. The supporting bracket 87 also supports the check fork shaft 55 and the transverse drive shaft 66. The rear end of the adjusting quadrant 86 is supported by a brace 86' secured to the quadrant and to the rear frame member 43. Adjustably mounted on the transverse rockshaft are the rearwardly extending crank arms 88, as best shown in Figures 4 and 5. The crank arm 88 comprises two rearwardly extending members 88' and 88'' having their forward ends notched and engaging the transverse rockshaft 85 and passing through slots in an angular supporting member 89. The angular supporting member is secured to the rockshaft 85 by the U-bolt 90. The U-bolt 90 when it is tightened by the nuts thereon clamps the members 88' and 88'' securely to the rockshaft 85 by means of the clamp supporting member 89. Pivotally mounted at the rear ends of the crank members 88' and 88'' is a wheel arm engaging member 91 which acts as the adjusting lever 84 is moved rearwardly to engage the wheel arm 80, as shown in Figure 5 to adjust the planter furrow openers 69 upwardly or to a shallow planting depth. As the adjusting lever 84 is moved forwardly the furrow openers 69 are adjusted to a deeper planting depth. The wheel arm 80, as it is pivoted to the front frame member 42, has an arched portion to extend over the top of the rear frame member 43 which is lower than the front frame member 42. It is thus seen that when the planter frame is raised by a master lever 92 for transport, the operation and mechanism of which will be described later, the wheel arms 80 with their corresponding gage wheels 79, as they are pivoted to the front frame member 42, they will remain on the ground detached from the members 91 until the transverse frame of the planter has been raised a sufficient height for the rear frame member 43 to engage the under side of the wheel arm 80 to simultaneously raise the gage wheels 79 for transport position. Since the wheel arm engaging member 91 only engages the top of the wheel arm 80, there is thus formed a lost motion connection between the crank arm 88 and the wheel arm 80 so that the weight of the planter frame acts to cause the wheel arm engaging member to engage the wheel arm 80 only when the gage wheels 79 are engaging the ground and when the adjusting lever 84 is adjusted rearwardly. When the adjusting lever 84 is in its forward position and the planter is in transport position the wheel arm 80 is engaged by the rear frame member 43 holding the gage wheel 79 in transport position while the adjusting crank arm 88 with its wheel arm engaging member 91 does not engage the wheel arm 80. The gage wheels 79 are both simultaneously adjusted when the planter is locked for planting by the lever 84 and likewise both gage wheels 79 are raised in transport position simultaneously when the rear frame member 43 engages the underneath portion of the respective wheel arms 80.

Figure 2:
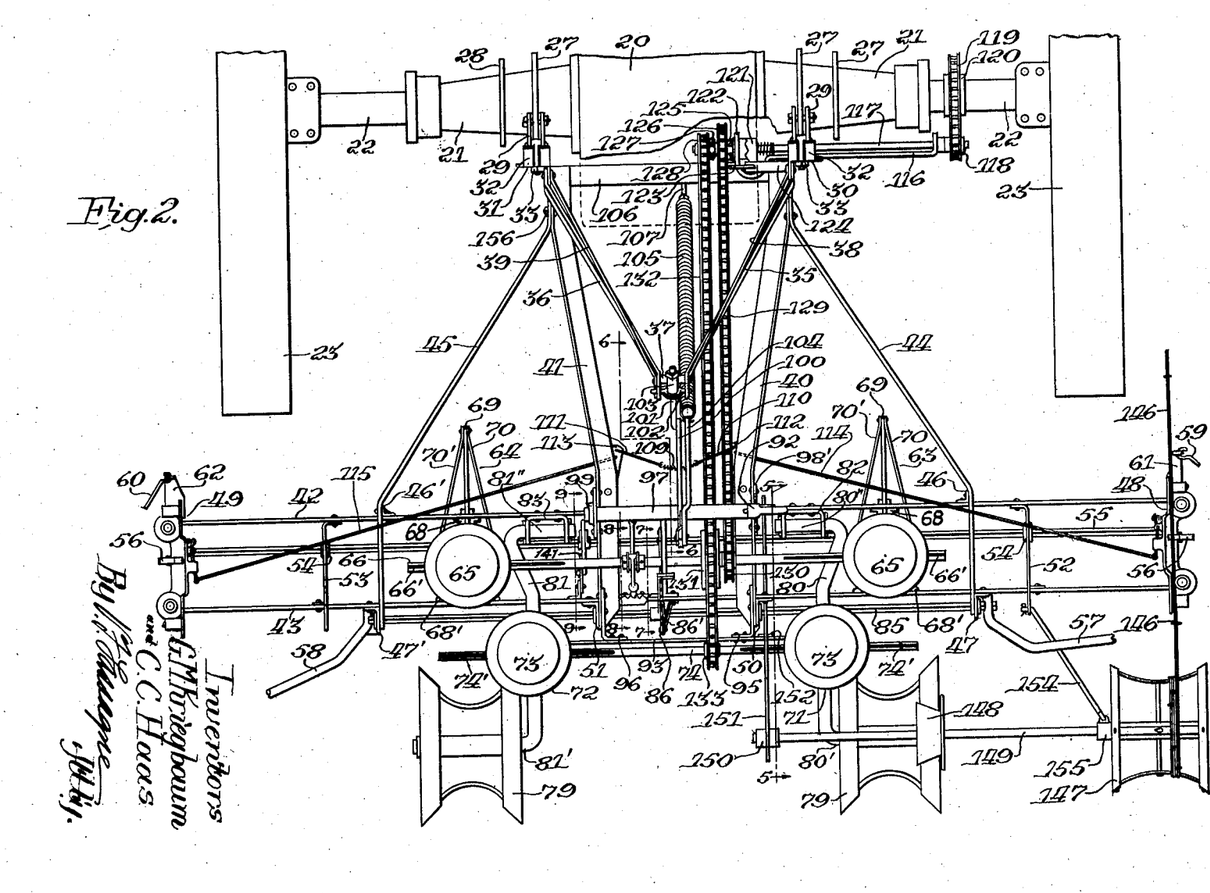
Figure 2 is a plan view of the planter mechanism shown in Figure 1.

The fertilizer units 71 and 72 are supported transversely on the planter by a transverse extending frame member 93, as best shown in Figures 2 and 4. Supporting brackets 94 are adjustably mounted on the transverse member 93 for supporting the fertilizer units 71 and 72 respectively in their respective adjusted positions according to the row spacing of the planting units 63 and 64. The transverse member 93 is secured by right and left hand supporting brackets 95 and 96 to the rear ends of the longitudinally extending frame members 40 and 41 respectively.

Figure 3:
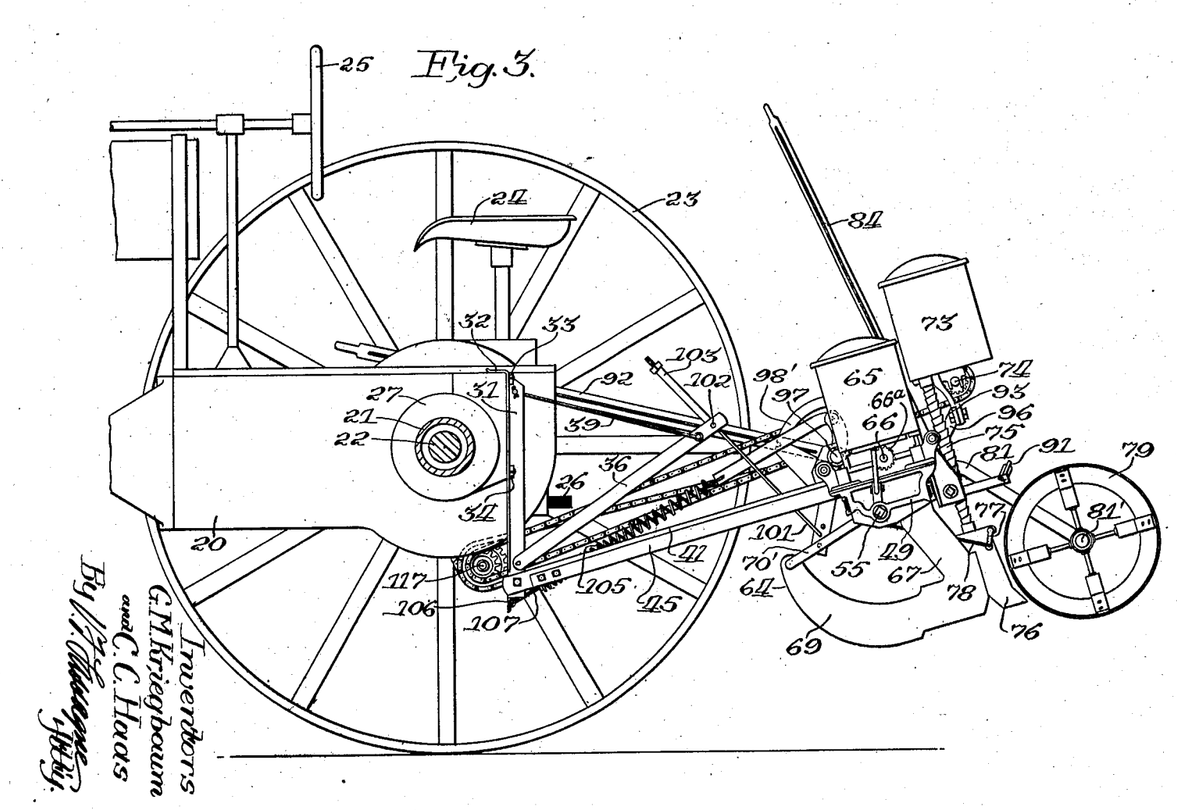
Figure 3 is a side elevation of the planter mechanism with the planter shown in transport position.

As best shown in Figures 1, 2, 3, and 6 the planter frame and its mechanism is raised from its trailing planting position to transport position by the master lever 92. The master lever 92 is secured to a transverse rockshaft 97 extending between the rear portion of the frame members 40 and 41 and journaled on the respective supporting brackets 98 and 99 secured to the frame members 40 and 41 respectively. The supporting bracket 98 has formed thereon an adjusting quadrant 98' about which the master lever 92 is adjusted in the usual manner by the usual thumb latch rod and detent. The adjusting quadrant 98', as best shown in Figure 6, has only two adjusting positions, the position as shown in Figure 6 with the adjusting lever 92 vertical which is the working position for the planter, and in the position as shown in Figure 3 with the lever 92 extending forward to a position across the rear axle of the tractor which corresponds to the raised or transporting position of the planter attachment. Secured to the mid-portion of the transverse rockshaft 97 is a forward and rearwardly extending integral crank arm 100. Pivotally secured to the forward end of the crank arm 100 is a lifting link 101 slidably mounted in a pivoted bracket 102 journaled in the rear ends of the rearwardly extending supporting members 35 and 36 respectively. The crank arm 100 has several adjusting holes for the link 101 so that the mechanical advantage of the lifting lever may be adjusted. In order to allow additional adjustment in case the planter attachment is used to plant over terraces, the adjusting member 103 which is slotted may be removed from the link 101 thereby permitting the planter attachment to have approximately 8 or 10 inches greater vertical movement so that as the wheel of the tractor rides over the ridge of the terrace the planter runner 69 will still engage the ground. This adjustment is only needed when the planter is used over terraces as the length of the link 101 as ordinarily used is sufficient always to allow the planter attachment runners to engage the ground. The rear end 100' of the arm 100 has a pivoted link 104 which is connected at its forward end to a spring 105. The spring 105 is connected at its forward end to a front cross member 106 secured at each end to the longitudinally extending frame members 40 and 41. The tension of the spring 105 may be adjusted in the usual manner by the threaded link member 107 connecting the spring to the cross member 106. The function of the spring 105 is to counterbalance the weight of the planter attachment in order to aid the operator when lifting the planter attachment to transport position by the lever 92.

Figure 1:
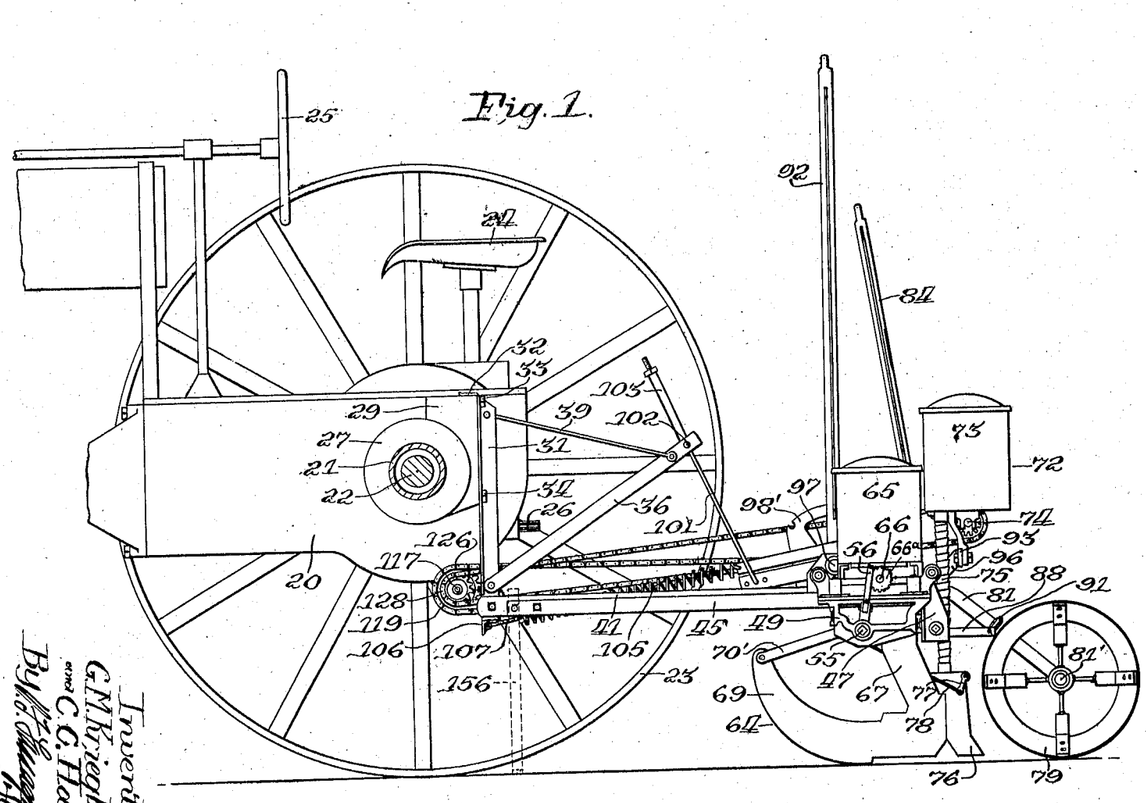
Figure 1 is a side view of the rear portion of a tractor having the novel planter construction mounted thereon.

In raising the planter attachment from the position as shown in Figure 1 to the transporting position shown in Figure 3, the operator pulls the lever 92, as best shown in Figures 1 and 6, forward to the latching position 108 on the quadrant 98'. As the lever 92 is pulled forwardly, the forward portion of the arm 100, which is secured to the same transverse shaft as the lever 92, swings downwardly about the shaft 97. Thus a downward pull is exerted on the bracket 102. Since the frame members 35 and 36 in which the bracket 102 is mounted are fixed, and the distance between the bracket 102 and the point of attachment of the link 101 to the arm 100 cannot change, downward movement of the forward end of the arm 100 causes an upward movement of the planter attachment. In this manner the planter attachment is allowed to be raised in a vertical plane about the lower ends of the supporting members 30 and 31 to which the forwardly extending frame members 40 and 41 of the planter attachment are pivoted. Relative movement or lost motion of the link 101 with respect to the stationary supporting frame is provided through the pivoted bracket 102 supported in the frame members 35 and 36. This will permit the implement frame to freely follow the contour of the ground in the ground engaging position. It is thus seen that a simple lift mechanism has been provided integral with the planter attachment for raising the planter frame vertically with respect to its supporting frame secured to the tractor without having any rockshaft or other additional raising and lowering devices secured to the tractor frame. The planter attachment as disclosed with its raising and lowering mechanism provides a compact unit which may be readily detached or attached to the tractor by the adjusting of the securing members 33 and 34.

As the planter attachment is raised to transport position by the operation of the lever 92, the crank arm 100, as it moves downwardly relative to the planter frame, engages a spring member 109 which is secured at both ends to links 110 and 111 respectively. These links 110 and 111 respectively are pivotally connected to pivoted link members 112 and 113 which in turn are pivotally mounted on the frame members 40 and 41. The links 112 and 113 have pivotally connected thereto transversely extending links 114 and 115 which are connected to the doffing mechanism of the check wire guides 48 and 49 in the manner shown and disclosed in the patent to Ford 1,376,522, May 3, 1921. It is thus seen that, as the planter attachment is raised, the crank arm 100 engages this resilient connection 109 causing the links 114 and 115 to release the doffing mechanism of the check wire guides 48 and 49 which in turn allows the check wire which happens to be mounted in either of the check wire guides 48 or 49 to be released.

Supported at the lower end of the supporting member 30 is the transversely extending planter jack-shaft supporting member 116 having forwardly extending portions through which a jack-shaft 117 is suitably journaled. The right hand end of the jack-shaft 117 has secured thereto a sprocket 118 which is driven through the chain 119 from the driving sprocket 120 secured to the revolving axle shaft 22. At the left hand end of the jack-shaft 117 are the spring pressed clutch members 121, one of which is secured to the jack-shaft while the other clutch member 122 is allowed to revolve freely on the jack-shaft 117. The clutch members 121 and 122 are thrown out of disengagement by the clutch throw-out member 123 slidably supported in the bracket 124 secured to the supporting member 30, (Figure 2). The throw-out member 123 has a laterally extending portion on its upper end which is so positioned on the attachment as to be in the path of movement of the lever 92 and is engaged thereby to be moved downwardly. The clutch members 121 and 122 will thus be disengaged from each other when the lifting lever 92 is in the position, as shown in Figure 3 so that, as the planter is raised to transport position, the drive mechanism of the planter is simultaneously and automatically thrown out of operation. If the operator desires to throw out the clutch members without lifting the planter attachment, the throw-out member 123 is near enough to the operator's station to enable him to depress the upper end thereof and throw out the same independently of the lifting mechanism. Secured to the clutch member 122 are a plurality of sprockets 125, 126, 127, and 128. The drive sprockets 125, 126, and 127 are used to drive the planter mechanism at speeds proportionate to the forward travel of the tractor. The drive sprocket 128 is used to drive the fertilizer attachments 71 and 72. The planting mechanisms of the planting units 63 and 64 are driven from the sprockets 125, 126, or 127, through the chain drive 129 driving the sprocket 130 of the clutch mechanism 131 on the planter drive shaft 66. The planter clutch mechanism 131 is shown diagrammatically and may be of the type disclosed in the patent to Dennis 1,543,603, granted June 23, 1925. The check fork shaft 55 is operatively connected to the clutch mechanism 131 as disclosed in the aforesaid patent to Dennis. The fertilizer mechanism of the fertilizing units 71 and 72 are driven from the sprocket 128 through the chain drive at 132 to the driven sprocket 133 on the fertilizer units drive shaft 74. It is to be understood that suitable chain tightening mechanism may be used to adjust the tension of the respective chain drives 119, 129, and 132. The chain 129 may be changed from one sprocket to the other of the drive sprockets 125, 126, and 127. As shown in Figures 2 and 3 the number of seeds dropped by the planting units 63 and 64 may be adjusted by the lever 134 which is pivotally and longitudinally mounted between the front frame member 42 and a supporting quadrant 135 on the rear frame 43, as best shown in Figure 8. A detent 136 engages notches 137, corresponding to the number of seeds to be dropped in each hill. Upstanding fork members 138 engage the yoke member 139 on the revolving planter mechanism drive shaft 66. The lever 134 with its detent 136 is resiliently held in place by the spring 140 on the longitudinally extending pivot portion 134' of the lever 134. With this construction the shaft 66 may rotate at all times and still be adjusted axially transversely of the planting units 63 and 64 so that the seed plates may be revolved proportionately to the number of seeds to be dropped in a hill which is old in the art and is best disclosed in the patent to Englund 918,983 granted April 20, 1909. The shaft 66 has two combination gears 66a and 66b, each of which has two kinds of gear teeth. Gear teeth of the same kind on the respective gears are thrown into play with their respective planter units upon operating the lever 134.

As shown in Figures 2 and 9 the latch device for locking the valve mechanism of the planting units 63 and 64 is operated so that the planter units 63 and 64 may be used to drill instead of being used as check row planters. As best shown in Figure 9 and disclosed in the patent to Dennis 1,725,446, above cited, the lever 141 which is pivoted to a bracket 142 supported on the rear frame member 43 has pivotally mounted thereon a link 143 with a slot 144 formed by bending over a portion of the link 143 upon itself. The slot 144 forms a lost motion connection between an upstanding crank arm 145 secured to the check fork shaft 55. The slot 144 permits the check fork shaft 55 to oscillate when the planter attachment is being used as a check row planter. When the lever 141 is pulled rearwardly the mechanism on the check fork shaft 55 which engages the clutch mechanism 131 on the planter drive shaft 66 is thrown out of engagement with the clutch mechanism 131 so that the mechanism of the planter unit 63 and 64 may be continuously driven so that the planter will continuously drill the seeds instead of dropping them in spaced hills as when the check fork shaft mechanism engages the clutch 131. The lever 141 when pulled rearwardly forms a toggle lock to lock the check fork shaft 55 out of engagement with the clutch member 131. At the same time the check fork mechanism is held out of engagement with the clutch member 131, the valve mechanism in the seed boot is also held in position for drilling. It is to be understood that the spring tension of the check fork shaft 55 may be adjusted in any usual manner, as shown in the patent to Van Der Vliet 1,667,362, April 24, 1928. The spring tension means for returning the check fork shaft 55, after it has been moved by a button on the check wire, comprises generally a spring 55a connected to an arm 55' fixed to the shaft 55 and to an adjustable holder 55b longitudinally slidable in a slot in a depending bracket 55c on the rear frame member 43, Figures 4 and 9.

As best shown in Figure 2, the check wire 146 may be wound upon the reel 147 after the field has been planted, by means of the friction wheel 148 engaging the covering wheel 79. The friction wheel 148 is secured to the reel shaft 149 which is journaled in a bearing 150 at the inner end which is, in turn, supported in the longitudinally extending supporting member 151. The supporting member 151 is passed through either vertical slot 152 located in brackets 50 and 51 on the rear frame member 43, depending upon which side of the implement the reel is to be placed, and forwardly through a slot in a bracket on the front frame member 42, as best shown in Figures 2 and 4. The supporting member 151 has a notch at its front end which engages the wall of the slot in the supporting bracket mounted on the front frame member 42 to keep it in its attached position. The weight of the reel 147 which is secured to the reel shaft 149 holds the friction wheel 148 in engagement with the gage wheel 79. The reel and the reel shaft are held in their transverse aligned position with the frame members 42 and 43 of the planter by means of a link 154 attached at its front end to the supporting bracket and at its rear end to a bearing 155 in which the reel shaft 149 is journaled. In reeling, unreeling, and in transport, the reel and shaft are supported as shown in Figure 2. However, after the check-wire has been laid out prior to planting, the reel and its mechanism is removed and laid to one side until after the field has been planted when it is again attached for reeling up the check-wire and to transport the same. As the gage wheels 79 and the supporting brackets 50, 51, 52, and 53 are symmetrically placed the reel and its mechanism may likewise be placed opposite to the position shown in Figure 2 so that the reel may be operated to take up the check wire on either side of the planter attachment. It is to be understood that the reel shaft 149 could be driven in any other suitable manner. It is also to be understood that the reel shaft and the planter mechanism and its fertilizer attachment could be driven from the power take-off shaft 26. In winding the check wire on the reel 147 the friction wheel 148 is so proportioned that it revolves the reel 147 at a greater speed than the forward movement of the tractor in order to have the check wire under tension, as it is wound upon the reel. When the check wire is unreeled for the first checking operation the friction between the friction wheel 148 and the gage wheel 79 is sufficient to keep a check wire under tension.

In order to detach the planter attachment from the tractor, as best shown in Figure 1, the planter attachment is lowered from its transport position, as shown in Figure 3 by the lever 92. Next the lever 84 is adjusted so that the gage wheels 79 engage the ground and are locked in position by the lever 84. Next a pivoted support 156 which is secured to the front frame member is locked so that it engages the ground as shown in Figure 1. The chain 119 is then removed from the sprockets 118 and 120. Next the pivoted bolts 33 and 34 attaching the upright support members 30 and 31 to the coupling members 29 are unloosened and swung out of position. The tractor may then be driven away and it is ready to be attached to any other quick detachable implements. It is to be understood that the planter attachment may be readily attached to the tractor by going through the previous operation in the reverse order.

As will be obvious to those skilled in the art, other implements can be attached to the implement frame structure which has been previously described or other forms of planter and fertilizer mechanisms may be used. It is also to be understood that other forms of lifting and lowering mechanisms may be used for raising and lowering the implement frame; and, a wide range of utility is therefore attainable to meet any requirement arising in connection with the implement frame and its planter attachment. It is further understood that materials suitable to the stresses encountered in a direct connected planter attachment of this nature are to be used. The preferred embodiment of the invention herein described is capable of certain modifications without departure from the scope of the invention to be defined in the following claims.

What is claimed is:

1. The combination with a tractor having a transversely extending frame portion, of an implement frame wholly supported therefrom in transport position having ground engaging tools and gage means therefor, means for adjusting said gage means relative to said implement frame, adjusting means for raising and lowering said implement frame relative to said tractor whereby said implement frame may be raised and lowered from ground engaging to transporting position, and a lost motion connection means between said gage means and the adjusting means for said gage means whereby the implement frame will pick up and support said gage means after part of the travel of said implement frame from ground engaging to transporting position.

2. The combination with a tractor having a transversely extending frame portion, of an implement attachment supported therefrom when in transport position, said implement attachment comprising a supporting frame for attaching said implement attachment to the aforesaid frame portion, an implement frame pivotally mounted on said supporting frame for vertical movement, supporting means rigidly mounted on the aforesaid supporting frame and overhanging the same, and lifting means on the implement frame connected to the aforesaid supporting means, whereby said implement frame may be raised and lowered from ground engaging to transporting position.

3. The combination with a tractor having a transversely extending frame portion, of an implement attachment supported therefrom when in transport position, said implement attachment comprising a supporting frame for attaching said implement attachment to the aforesaid frame portion, an implement frame pivotally mounted on said supporting frame for vertical movement, supporting means rigidly mounted on the supporting frame and overhanging the same, means pivotally mounted on the aforesaid supporting means, and lifting means on said implement frame connected to the aforesaid pivotal means, whereby said implement frame may be raised and lowered from ground engaging to transporting position.

4. The combination with a tractor, of an implement attachment wholly supported therefrom when in transport position, said implement attachment comprising a supporting frame and an implement frame connected thereto for movement in a vertical plane, planter mechanisms and fertilizer mechanisms adjustably mounted on said implement frame for lateral adjustment, planter and fertilizer drive mechanisms supported on said implement frame, means for adjustably connecting said planter and fertilizer mechanisms to said planter and fertilizer drive mechanisms, a transversely extending jack-shaft supported on said supporting frame, means for driving said jack-shaft from the tractor, and means for driving the planter and fertilizer drive mechanisms from the jack-shaft.

5. A planter attachment for a tractor, comprising a supporting frame for attaching said attachment to the tractor, a longitudinally extending draft frame connected to said supporting frame, a transversely extending implement frame, planting mechanism mounted thereon, means for driving said planting mechanism mounted on said implement frame, a jack-shaft transversely supported on said supporting frame, means for driving said driving means for said planting mechanism from said jack-shaft, lifting means mounted on said implement attachment and connected to said supporting frame whereby said implement frame is raised and lowered from ground engaging to transporting position, gage means mounted on said implement frame for supporting said implement frame in ground engaging position, and means for adjusting said gage means.

6. In combination, a tractor, an implement frame connected to the tractor for vertical movement thereon, means for raising and lowering the implement frame, ground engaging tools and gage means connected to said implement, and means for adjusting the gage means including a lost motion connection with the gage means, said gage means adapted to free itself by means of said lost motion connection to be supported by the implement frame when the frame and tools are raised out of their ground engaging position.

7. In combination, a tractor, an implement frame connected to the tractor for vertical movement thereon, means for raising and lowering the implement frame, ground engaging tools carried by the frame, gage means, a supporting means for the gage means pivotally mounted on the frame and adapted to engage the frame at only its pivot point when the tools are engaging the ground, and means for adjusting the supporting means about its pivot including a lost motion connection adapted to permit engagement of the supporting means at another point with the implement frame when the same is raised from ground engaging position, whereby the gage means will be picked up therewith.

8. In combination, a tractor, an implement frame connected to the tractor for vertical movement, means for raising and lowering the implement frame, said frame including two spaced transversely extending members, ground engaging tools carried by the frame, gage wheels, supporting arms for the gage wheels pivoted on one of said transverse members and arranged to be out of contact with the other transverse member when the tools are engaging the ground, and means for adjusting the supporting arms including a lost motion connection adapted to permit engagement of the pivoted supporting arms with said other transverse member when the same is raised from ground engaging position, whereby the gage wheels will be picked up therewith.

9. In combination, a tractor, an implement attachment wholly supported on the tractor in transport position comprising a supporting frame, a boom structure carried by the supporting frame, an implement frame mounted for movement on the supporting frame, and lifting means on the implement frame and connected to the boom structure for raising and lowering the implement frame with respect to the boom structure.

10. In combination, a tractor, an implement attachment wholly supported on the tractor in transport position comprising a supporting frame, a boom structure carried by the supporting frame and including upwardly inclined supporting members and pivotal means mounted on the ends of said supporting members, an implement frame mounted for movement on the supporting frame, and lifting means on the implement frame and connected to the pivotal means on the boom structure for raising and lowering the implement frame with respect to the boom structure.

GEORGE M. KRIEGBAUM.
CLARENCE C. HAAS.